United States Patent [19]
Abadi et al.

[11] Patent Number: 6,141,760
[45] Date of Patent: Oct. 31, 2000

[54] SYSTEM AND METHOD FOR GENERATING UNIQUE PASSWORDS

[75] Inventors: Martin Abadi, Palo Alto; Krishna Bharat, Santa Clara; Johannes Marais, Mountain View, all of Calif.

[73] Assignee: Compaq Computer Corporation, Houston, Tex.

[21] Appl. No.: 08/962,505

[22] Filed: Oct. 31, 1997

[51] Int. Cl.[7] .................................................. H04L 9/00
[52] U.S. Cl. ........................................ 713/202; 713/184
[58] Field of Search .................................... 713/200, 201, 713/202, 183, 184; 707/9; 380/23, 25; 709/229; 710/200; 455/411

[56] References Cited

U.S. PATENT DOCUMENTS

| | | | |
|---|---|---|---|
| 5,347,579 | 9/1994 | Blandford | 380/25 |
| 5,684,951 | 11/1997 | Goldman et al. | 395/188.01 |
| 5,719,941 | 2/1998 | Swift et al. | 380/25 |
| 5,812,819 | 9/1998 | Rodwin et al. | 395/500 |
| 5,844,497 | 12/1998 | Gray | 340/825.34 |
| 5,845,070 | 12/1998 | Ikudome | 395/187.01 |
| 5,847,957 | 12/1998 | Cohen et al. | 364/468.15 |
| 5,892,905 | 4/1999 | Brandt et al. | 395/187.01 |
| 6,006,333 | 12/1999 | Nielsen | 713/202 |
| 6,079,021 | 6/2000 | Abadi et al. | 713/202 |

OTHER PUBLICATIONS

Hensley et al.; Proposal for an Open Profiling Standard; located @ www.12w3.org/TR/NOTE-OPS-FrameWork.html; downloaded Oct. 1997.

Hensley et al.; Implementation of OPS Over HTTP; located @ www.w3.org/TR/NOTE-OPS-OverHTTP.html; downloaded Oct. 1997.

Hensley et al.; Standard Practices for OPS Systems; located @www.w3.org/TR/NOTE-OPS-StandardPractices.html; downloaded Oct. 1997.

Hoff et al.; The HTTP Distribution and Replication Protocol; located @ www.w3.org/TR/NOTE-drp-19970825.html; downloaded Oct. 1997.

*Primary Examiner*—Robert W. Beausoliel, Jr.
*Assistant Examiner*—Scott T. Baderman
*Attorney, Agent, or Firm*—Fenwick & West LLP

[57] ABSTRACT

A computerized method is provided for generating passwords for password controlled access points. Provided are a master password, an access password, and a user name. The master password, the service name, and the user name are combined using an irreversible function to generate a unique password. The function can be a one-way hash function. The combining can be performed by a browser of a client computer. A similar combining can also be used to generate a user name from the master password and the user's real name.

20 Claims, 2 Drawing Sheets

6,141,760

SYSTEM AND METHOD FOR GENERATING UNIQUE PASSWORDS

FIELD INVENTION

This invention relates generally to computer systems, and more particularly to passwords used to gain access to computer system services and data records stored by computer systems.

BACKGROUND OF THE INVENTION

It is common to use passwords to allow users to access computer systems and data records. More recently, many services provided via the World-Wide-Web (the Web) also authenticate access with passwords. The use of passwords for access protection is so pervasive that it is not unusual for a user to have to remember a large number of different passwords.

Because of the large number of passwords that one might need to have, many users choose memorable passwords, which are easy to guess. A sophisticated imposter using automated schemes can easily "try" millions of common password variations in a matter of minutes. Because users often use the same password for many services, if the user's password for a particular service is disclosed, then the password could be used to access other accounts. In particular, the owners or administrators of one service could use the user's password to access the user's other accounts. In addition, for services that are accessed by many users, user names based on common names, e.g., "johnsmith," are quickly used up.

The problems with passwords are well known, and there have been a number of proposed replacements for passwords, in particular, schemes based on sophisticated cryptographic techniques or biometric identification, see Schneier, "Applied Cryptography." In some cases, these approaches can provide adequate security at the expense of requiring fundamental changes in how authentication systems operate.

Currently, an "Open Profiling Specification" is being considered by the Platform for Privacy Preferences (P3) project of the W3C. This specification may eventually provide a solution to the problem of password authentication on the Web, although the present efforts of the Open Profiling work concentrate on the exchange of user preferences between browser and server computers.

One could use Open Profiling for managing user passwords, and protecting the passwords from access by inappropriate servers. In all cases, Open Profiling requires awareness and cooperation by browsers and servers, so it cannot be used with current software. Moreover, Open Profiling requires access to a user-specific profile, which users will need to either fetch from a server or carry with them. Fetching over a network may not always be quick or possible, e.g., the profile may be behind a firewall or the network may be partitioned. Carrying the profile may be inconvenient or unsafe, since it may require use of floppy disks, smart-cards, or other auxiliary hardware.

Therefore, it is desired to provide a scheme in which the user is not required to remember many different passwords.

SUMMARY OF THE INVENTION

A computerized method is provided for generating passwords for password controlled access points. Provided are a master password, a service name, and a user name. The master password, the service name, and the user name are combined using an irreversible function to generate a unique password.

The function is a one-way hash function, e.g., the input cannot be determined from the output. The combining can be performed by a browser of a client computer. As an advantage the technique is easy to use, and the service name does not need to be kept secret. In addition, the method provides for a way to automatically generating unique user names. This is useful in the case of users with common "real" names.

DETAILED DESCRIPTION OF PREFERRED EMBODIMENTS

System Overview

Figure 1:
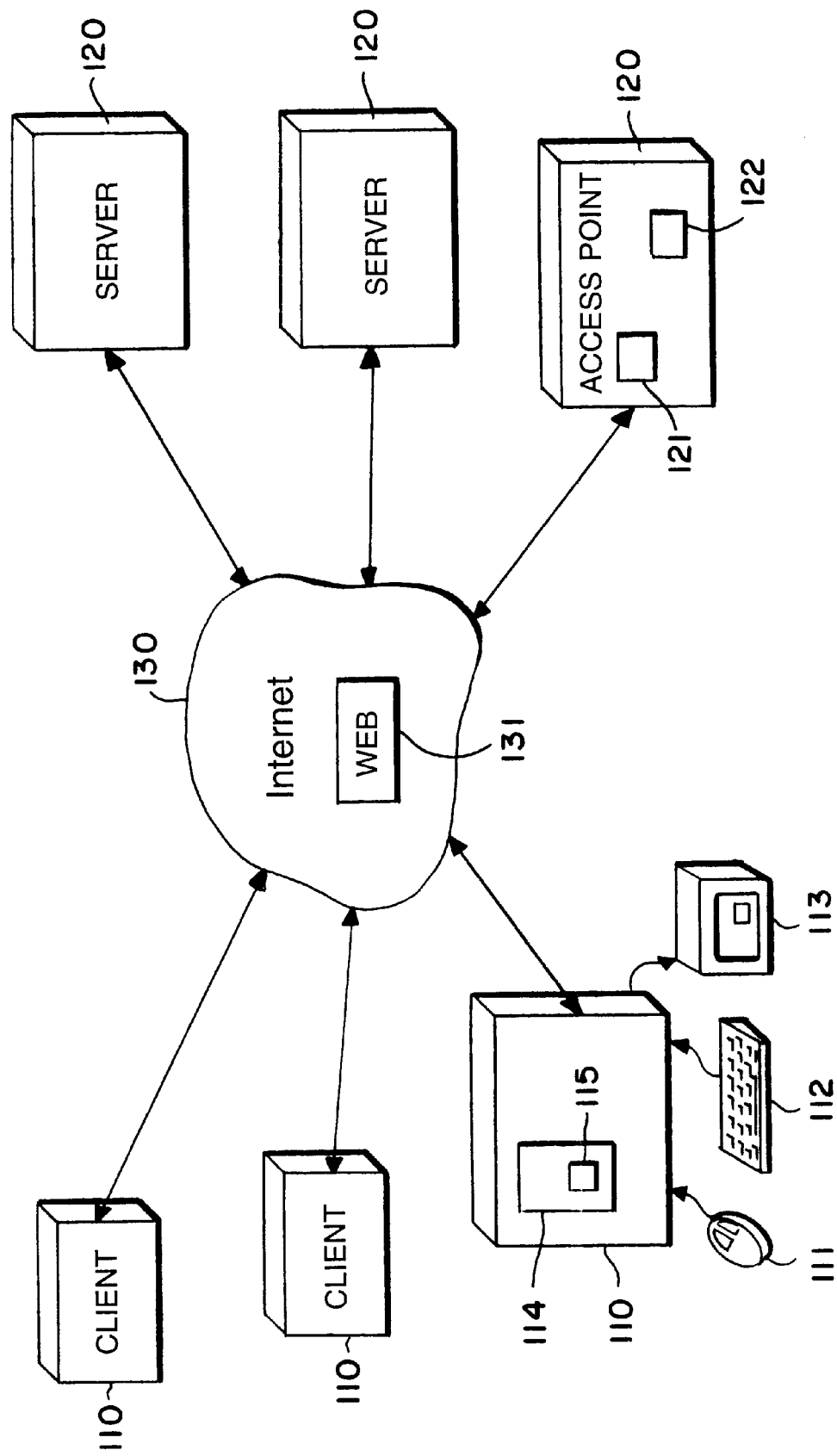
FIG. 1 is a block diagram of distributed computer system 100 providing services accessible using passwords according to the invention.

FIG. 1 shows a distributed computer system 100 providing services accessible using passwords generated according to the invention. The system 100 includes client computers 110 connected to server computers 120 via a communications network 130.

The client computers 110 can be lap-tops, personal computers, work-stations, or the like. The clients 110 generally include input and output (I/O) devices, for example, a mouse 111, a keyboard 112, and a monitor 113. The I/O devices allow users of the clients 110 to execute applications under the control of operating system software, for example, Microsoft Windows, or Unix. One of the applications can be a Web browser 114 such as the Netscape Navigator, or the Microsoft Explorer.

The network 130 can be the Internet supporting an application communications interface, for example, the World Wide Web (Web) 131.

The server computers 120 are usually larger computer systems characterized by providing services 121 and informational databases 122 accessible by many client computers all over the world.

System Operation

A typical user of the system 100 will provide a password to enable the operation of the client 110, additional passwords may be required to activate and access privileged software and applications of the client 110. Use of the network 130 may require yet another set of passwords. Access to the servers 120 and its services 121 and information 122 may be protected by a final layer of passwords. In a typical day, the user may need to remember dozens of passwords that get authenticated by password controlled access points. This is a burden, particularly when more sophisticated authentication processes require a long sequence of nonsense characters.

In order to lessen the burden of remembering a large number of passwords for different access points, and also to improve the security of passwords, the system 100 is enhanced as follows.

The Web browser 114, which has become a primary Web access tool, is provided with an extension 115, described in further detail below, which implements aspects of the invention.

Passwords Generation

Figure 2:
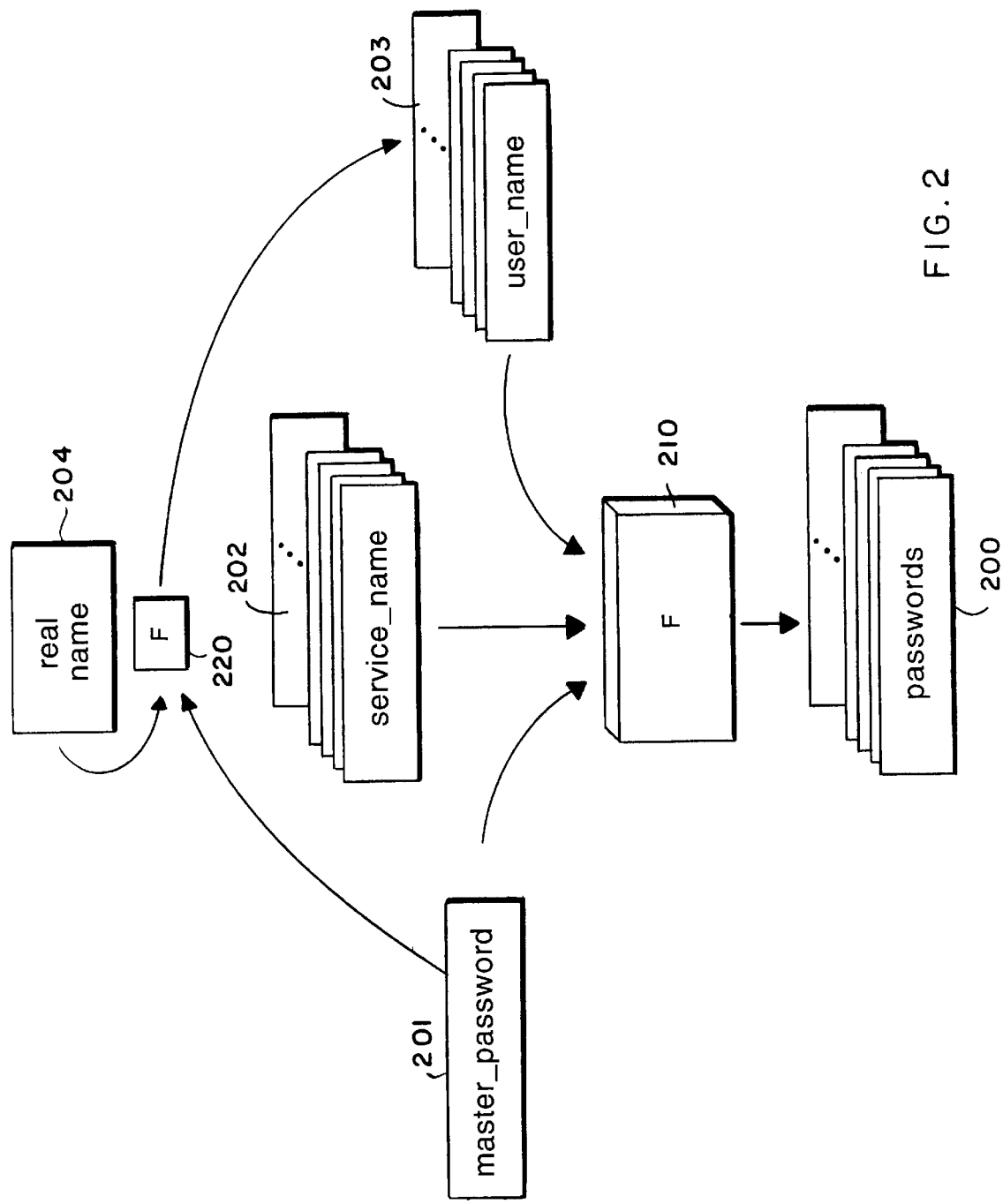
FIG. 2 is flow diagram of a preferred embodiment for generating passwords.

As shown in FIG. 2, passwords 200 are constructed as follows.

Each user chooses a first string as a master$_{13}$password 201. This is the only password the user must remember.

For any service, hardware or data structure that requires a password 200, generally "password controlled access points," second strings 202 form service_names 202. Service_names 202 need not be kept secret, and may be easy to remember and to guess.

In one implementation, each service_name 202 can be manually generated by the user. Alternatively, the service name may be automatically generated by the client or the access point, e.g., the server, from the domain name of the service, or data structure. Other possible service_names 202 could be the IP address of the password controlled access point, or the title of its entrance Web page. In a simplest implementation, any specific password protected access point can provide the same service_name to each user.

The string 202 is expressed in a canonical form to compensate for minor variations in the spelling of the service name as entered by the user. The canonical form can be obtained by ignoring all punctuation and spaces, converting uppercase characters to lowercase, and omitting common words such as 'The,' 'in,' 'and,' etc. For example, the user may take "The N.Y. Times" as the service_name 202 for accessing the New York Times on-line edition service. In canonical form, "The N.Y. Times" becomes "nytimes."

In addition, a third string, the user name 203, is associated with each user. As an advantage, it is possible to generate unique user names for users with common "real" names, such as John Smith. This is described in greater detail below.

An operation (F) 210 combines, for any particular user, the strings 201–203 to generate passwords 200. The operation 210 has the property that it is hard to invert, and that it maps different inputs to different outputs. That is, the likelihood that combinations of different input strings produce the same output string is minimal. The operation 210 can be implemented as part of the browser extension 115 of FIG. 1.

The method for generating unique user_names 203 can proceed as follows. The user supplies his master_passsword 201 (e.g., sdtTg2;wqz:r#), and his or her real name 204 (e.g., John Smith). A function 220 is applied. This function applies a one-way hash-function on the real name 204 and the master password to compute a unique string which is appended to the user's initials, (e.g., "js") to give a unique user_name 203, e.g., js4546Q. This function can be like the function 210 above although it operates on different strings. This method for generating unique user_names is optional, user-names can be generated by other methods, or the real names can be used.

The extension 115 can be started when the browser 114 is initialized, or the extension may be downloaded, on demand, via the Web. The extension can be implemented in the JavaScript language, for example. When the extension 115 is started, the user only needs to provide the master_password 201 and his or her common name.

As described above, each password controlled access point has an associated service_name 202. Therefore, when the user needs a password for a particular service, the browser extension must receive the corresponding service_name 202. The browser extension 115 then determines the correct password by applying the operation F 210 on the master_password, the service_name, and the user_name. The result is the user's password 200 for the access point and user in question. The user can enter the generated password using easy cut-and-paste operations, or the browser extension 114 could directly submit the password.

Because the password is generated from the master password 201 and the user name, it is generally immune to so-called "dictionary attacks".

The present invention enhances security and convenience. It allows users to remember only a single master password, and avoids the dangers of using the same password for many different controlled access points. In addition, the invention allows users to use the same user name across services, and avoids having to remember complicated user names.

Furthermore, the invention discourages users to expose passwords, e.g., by writing them down. An important aspect of this invention is that it can be integrated into current software for Web browsing. It does not require any changes in the concept of password, or any changes in server software.

It is understood that the above-described embodiments are simply illustrative of the principles of the invention. Various other modifications and changes may be made by those skilled in the art which will embody the principles of the invention and fall within the spirit and scope thereof.

What is claimed is:

1. A computerized method for generating passwords for password controlled access points, comprising the steps of:
   receiving a master password, a service name, and a user name; and
   generating a unique password at a local terminal by combining the master password, the service name, and the user name.

2. The method of claim 1 wherein the generating step uses an irreversible function.

3. The method of claim 2 wherein the function is a first one-way hash function.

4. The method of claim 1 wherein the combining step is performed by a browser of a client computer.

5. The method of claim 1 wherein the generating step is performed by an applet of a client computer.

6. The method of claim 1 wherein the service name is expressed in canonical form.

7. The method of claim 1 wherein the user name is derived by combining the master password and a real name of a user.

8. The method of claim 7 wherein the generating step uses a second one-way hash function.

9. The method of claim 1 further comprising the steps of:
   maintaining a plurality of service names within the local computer, each service name corresponding to one of the password controlled access points; and
   retrieving at least one service name for use in generating the unique password.

10. The method of claim 9 wherein the plurality of service names are automatically created by the local terminal.

11. The method of claim 9 wherein the plurality of service names are created by a user.

12. A computer apparatus for generating passwords comprising:
   a local computer;
      a receiving module adapted to receive a master password, a service name and a user name;
      a generation module adapted to generate a unique password at the local computer by combining the master password, the service name, and the user name.

13. The computer apparatus of claim 12 wherein the generation module is adapted to implement an irreversible function adapted to generate the unique password by combining the master password, the service name, and the user name.

14. The computer apparatus of claim 12 further comprising a browser applet within the local computer, said browser applet adapted to generate the unique password by combining the master password, the service name and the user name.

15. The computer apparatus of claim 12 wherein the generation module is adapted to implement a plurality of irreversible functions adapted to generate the unique password by combining the master password, the service name and the user name.

16. The computer apparatus of claim 12 further comprising a storage module adapted to store a plurality of service names within the local computer.

17. A computer program product comprising:
   a computer usable medium having computer readable code embodied therein for causing the generation of a unique password, the computer program product including:
      computer readable program code devices configured to cause a local computer to effect the reception of a master password, a service name and a user name;
      computer readable program code devices configured to cause the local computer to effect the generation of the unique password at the local computer by combining the master password, the service name, and the user name.

18. The computer program product of claim 17 further including a computer readable program code device configured to cause the local computer to effect the storage of a plurality of service names and a computer readable program code device configured to retrieve at least one of the service names for use in the generation of the unique password.

19. The computer program product of claim 17 further including a computer readable program code device configured to use an irreversible function to generate the unique password from the combination of the user name, the service name and the master password.

20. The computer program product of claim 17 further including a computer readable program code device configured to use a browser applet contained within the local computer to generate the unique password from the combination of the user name, the service name and the master password.

* * * * *